(12) United States Patent
Behymer et al.

(10) Patent No.: US 7,055,675 B2
(45) Date of Patent: Jun. 6, 2006

(54) CONVEYOR BELT CLEANING SYSTEM

(75) Inventors: Lance E. Behymer, Woodbury, MN (US); Smarajit Mitra, West Saint Paul, MN (US); Jerald W. Hall, Jr., Maplewood, MN (US); Alexander C. Tsuei, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/309,790

(22) Filed: Dec. 4, 2002

(65) Prior Publication Data

US 2004/0108187 A1  Jun. 10, 2004

(51) Int. Cl.
  *B65G 45/18* (2006.01)
(52) U.S. Cl. .................. 198/496; 198/498; 15/255.5
(58) Field of Classification Search ............... 198/496, 198/498, 495, 494; 15/256.5, 256.52, 244.2, 15/244.4
See application file for complete search history.

(56) References Cited

U.S. PATENT DOCUMENTS

| | | | | |
|---|---|---|---|---|
| 669,821 A | * | 3/1901 | Derdeyn .................... 198/496 |
| 1,165,404 A | | 12/1915 | Harrington |
| 2,083,864 A | * | 6/1937 | Puckett ....................... 198/496 |
| 2,512,073 A | * | 6/1950 | Sandberg ................. 198/626.1 |
| 2,730,770 A | * | 1/1956 | Higginbotham et al. .. 15/256.52 |
| 2,858,576 A | * | 11/1958 | Rose ........................ 15/256.52 |
| 3,047,133 A | * | 7/1962 | Searles ....................... 198/498 |
| 3,430,758 A | * | 3/1969 | Searles ....................... 198/498 |
| 3,656,200 A | * | 4/1972 | Riley, Jr. ..................... 15/97.1 |
| 3,875,613 A | | 4/1975 | Pincus |
| 3,948,383 A | | 4/1976 | Janitsch et al. |
| 4,054,404 A | * | 10/1977 | Marsh ........................ 425/231 |
| 4,072,092 A | | 2/1978 | Kohli et al. |
| 4,218,131 A | * | 8/1980 | Ito et al. ..................... 399/350 |
| 4,272,184 A | * | 6/1981 | Rezanka .................... 399/356 |
| 4,286,039 A | * | 8/1981 | Landa et al. ............... 430/119 |
| 4,395,113 A | * | 7/1983 | Buchan et al. ............. 399/348 |
| 4,412,736 A | * | 11/1983 | Sakamoto et al. ......... 399/354 |
| 4,515,467 A | * | 5/1985 | Suzuki ....................... 399/354 |
| 4,533,235 A | * | 8/1985 | Uchida ....................... 399/357 |
| 4,664,719 A | * | 5/1987 | Mizutani ....................... 134/6 |
| 4,907,690 A | * | 3/1990 | Spohn ........................ 198/498 |
| 4,934,513 A | * | 6/1990 | Kirkpatrick et al. ........ 198/612 |
| 4,990,962 A | * | 2/1991 | Kishi ......................... 399/233 |
| 5,005,861 A | * | 4/1991 | Breed et al. ............... 280/734 |
| 5,034,778 A | * | 7/1991 | Levanon et al. ........... 399/249 |
| 5,117,967 A | * | 6/1992 | Morrow et al. ............ 198/495 |
| 5,225,853 A | * | 7/1993 | Kobayashi et al. .......... 347/33 |
| 5,251,348 A | * | 10/1993 | Corrado et al. .......... 15/256.53 |

(Continued)

FOREIGN PATENT DOCUMENTS

GB 2082133 A * 3/1982

*Primary Examiner*—Kathy Matecki
*Assistant Examiner*—Rashmi Sharma
(74) *Attorney, Agent, or Firm*—Stephen W. Buckingham

(57) ABSTRACT

An assembly for cleaning a conveyor belt system is disclosed. The cleaning assembly is for a conveyor belt system with the type having first and second endless belts which each traverse a separate belt travel path and together define a generally upright article transport path between opposed top faces of the belts. The cleaning assembly includes a belt wiping blade assembly for moving liquids and debris from a belt, an absorbent material downstream from the blade assembly for wiping excess liquid from the belt, and belt edge seals disposed between the opposed top faces of the belts along the article transport path.

33 Claims, 7 Drawing Sheets

U.S. PATENT DOCUMENTS

| | | | |
|---|---|---|---|
| 5,332,642 A * | 7/1994 | Simms et al. ................ 430/125 |
| 5,338,340 A | 8/1994 | Kasmark, Jr. et al. |
| 5,400,897 A * | 3/1995 | Doyle ........................ 198/496 |
| 5,493,369 A * | 2/1996 | Sypula et al. ............... 399/240 |
| 5,497,872 A * | 3/1996 | Pennino ..................... 198/498 |
| 5,530,537 A * | 6/1996 | Thayer ....................... 399/357 |
| 5,534,063 A * | 7/1996 | Maruyama et al. ........... 118/60 |
| 5,638,842 A * | 6/1997 | Tokita et al. ............ 134/104.1 |
| 5,640,655 A * | 6/1997 | Shoji ......................... 399/249 |
| 5,705,447 A * | 1/1998 | Kubo ......................... 442/334 |
| 5,737,796 A * | 4/1998 | Sendzimir et al. ............. 15/308 |
| 5,737,846 A * | 4/1998 | Warren et al. ................. 34/71 |
| 5,752,144 A * | 5/1998 | Mammino et al. .......... 399/249 |
| 5,758,237 A * | 5/1998 | Abramsohn ................ 399/249 |
| 5,774,177 A | 6/1998 | Lane |
| 5,856,245 A | 1/1999 | Caldwell |
| 5,912,116 A | 1/1999 | Caldwell |
| 5,873,014 A * | 2/1999 | Knapp et al. ............... 399/249 |
| 5,874,164 A | 2/1999 | Caldwell |
| 5,931,971 A | 8/1999 | Zucker |
| 6,006,062 A * | 12/1999 | Takahashi et al. ............ 399/10 |
| 6,040,251 A | 3/2000 | Caldwell |
| 6,083,602 A | 7/2000 | Caldwell |
| 6,149,781 A | 11/2000 | Forand |
| 6,223,008 B1 * | 4/2001 | Takahashi et al. ............ 399/66 |
| 6,270,893 B1 * | 8/2001 | Young et al. ............... 428/372 |
| 6,357,350 B1 * | 3/2002 | Kerr ........................ 101/389.1 |
| 6,411,785 B1 * | 6/2002 | Ogawahara et al. .......... 399/69 |
| 6,508,602 B1 | 1/2003 | Gruenbacher et al. |
| 6,529,700 B2 * | 3/2003 | Nukada et al. ............. 399/249 |
| 6,530,658 B1 * | 3/2003 | Pham ........................ 347/104 |
| 6,643,478 B2 * | 11/2003 | Okano ........................ 399/70 |
| 6,679,601 B1 * | 1/2004 | Pham et al. ................ 347/104 |
| 2002/0017310 A1 | 2/2002 | Gruenbacher et al. |
| 2002/0155772 A1 | 10/2002 | Wong et al. |

\* cited by examiner

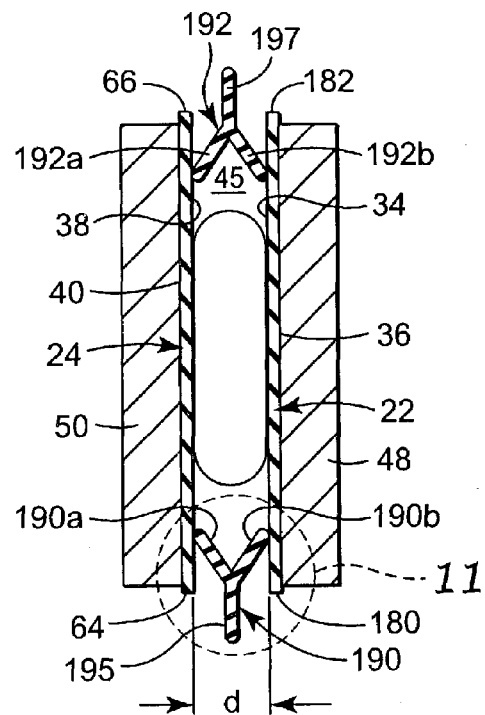
FIG. 1A
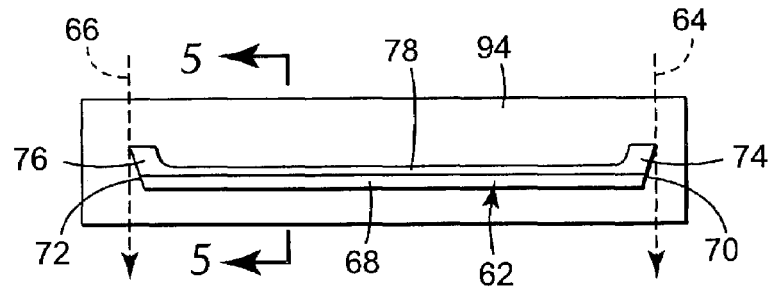
FIG. 2
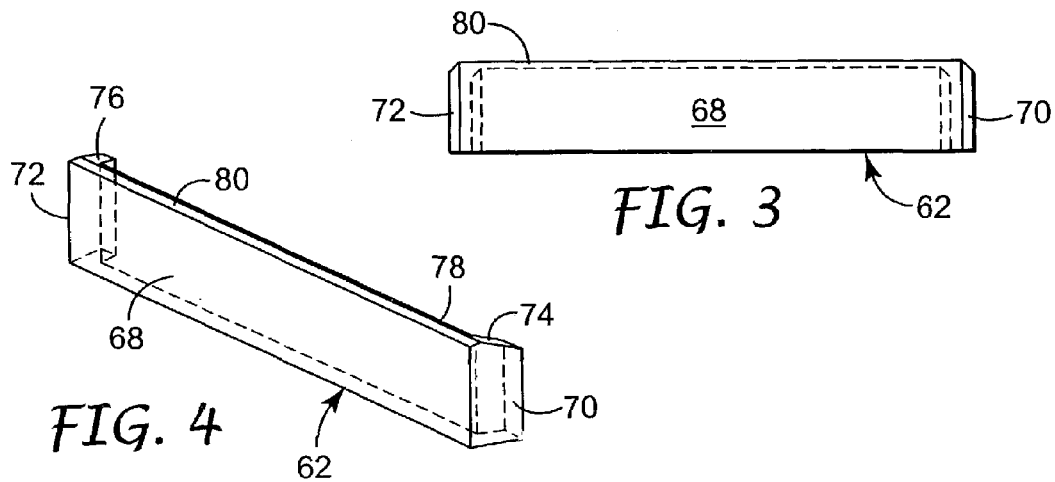
FIG. 3
FIG. 4

CONVEYOR BELT CLEANING SYSTEM

BACKGROUND OF THE INVENTION

The present invention is directed to a system for cleaning conveyor belts, and particularly to a cleaning assembly for dual conveyor belt systems.

A conveyor system employing an endless belt may, over time, require cleaning of the belt surface. This is particularly true when the belt is used for conveying an article during processing of the article where portions of the article, in one form or another, are transformed. Such transformations may be accomplished by, for example, applying pressure or heat to the article being conveyed.

One form of such a conveying system employs two endless belts. Each belt traverses a separate belt travel path, with the two belt travel paths together defining an article transport path between opposed faces of the belts. The article being conveyed, upon entry into the article transport path, is simultaneously engaged by the opposed faces of the two belts as it moves along an article processing path. One specific example of such a process is a cooking process, where the article being conveyed is a food item which is cooked while simultaneously being conveyed by the conveyor belt system. In an article cooking application, heat may be applied to the article as it is conveyed by the two belts along the article transport path defined by the belts.

As the article is heated, fluids in the article may leave the article in liquid form (i.e., water or oils) or in gas form (i.e., steam or vapor). In addition, portions of the article may separate from the article during processing, causing debris to remain on the belt once the article has left the article transport path. As the endless belts operate over time to transport a plurality of articles, the build up of liquids and debris on the belts can become significant, affecting the performance of the belts in processing the article. In addition, the migration of fluids and/or debris into the operating equipment for the belts and other associated processing equipment can degrade the performance of such equipment. Therefore, it is desirable that any debris or excess liquids created on the belt during processing be removed from the belt in an efficient and expeditious manner.

BRIEF SUMMARY OF THE INVENTION

In one embodiment, the present invention is an assembly for cleaning a conveyor belt system of the type having first and second endless belts, wherein each belt traverses a separate belt travel path and together the belts define a generally upright article transport path between opposed top faces of the belts. The cleaning assembly includes a blade engaging the top face of each belt, adjacent a lowest extent of the belt's travel path, to wipe liquid and debris from the belt. The blade has an elongated central section and lateral end edges, with each end edge having a diversion ramp projecting upstream, relative to belt movement past the blade, for directing liquids and debris away from the lateral edges of the belt. A filter is disposed under each belt for separating particulate debris from liquids directed onto the filter from the blade. A collector is disposed under the filter for receiving the liquid passing through the filter.

In another embodiment, the cleaning assembly includes a pair of seals disposed between and engaging the opposed top faces of the belts along the article transport path. Each seal resiliently extends adjacent lateral side edges of the opposed belt faces to prevent liquid and debris from moving to the lateral side edges and bottom face of each belt.

In another embodiment, the present invention is a cleaning assembly for removing liquids from an endless conveyor belt which comprises a liquid absorbent material disposed adjacent the belt. The absorbent material has a contact face thereon which is moveable relative to the belt so that different portions of the contact face are sequentially engageable with the belt for wiping liquids from the belt.

BRIEF DESCRIPTION OF THE DRAWINGS

The present invention will be further explained with reference to the drawing figures listed below, wherein like structures are referred to by like numerals throughout the several views.

FIG. 1A is a sectional view as taken along lines 1A—1A in FIG. 1, showing a pair of belt seals between opposed faces of the belts along an article transport path defined by and between the belts.

FIG. 2 is a plan view, as viewed from the article conveying belt face, of a belt cleaning blade assembly of the present invention.

FIG. 3 is a view of the blade of FIG. 2, as viewed from the downstream side of the belt.

FIG. 4 is a perspective view of the blade of FIG. 2.

While the above-identified drawing figures set forth several embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the spirit and scope of the principles of this invention.

DETAILED DESCRIPTION

Figure 1:
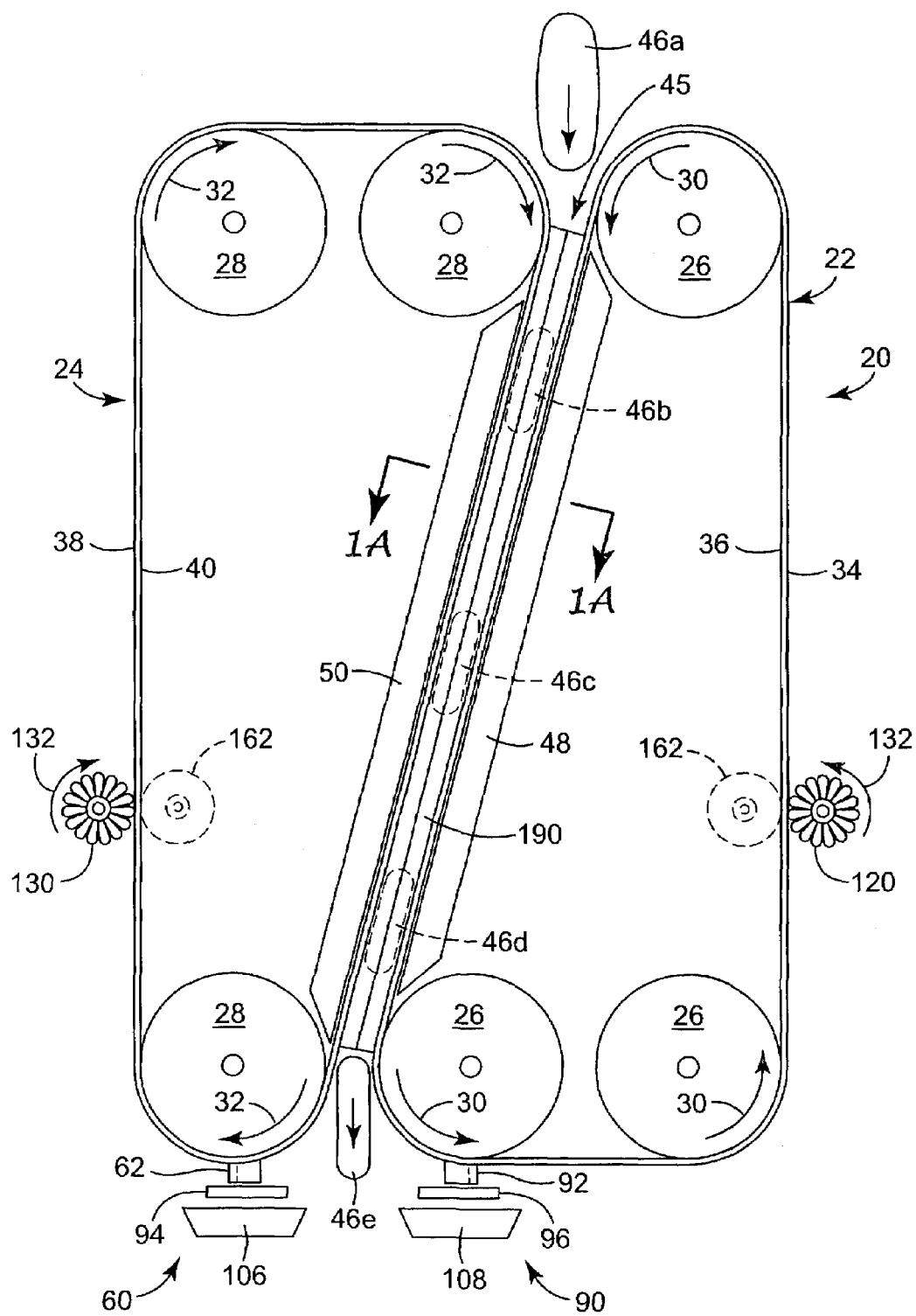
FIG. 1 is a schematic illustration of a conveyor belt system having the inventive cleaning assembly thereon.
Figure 5:
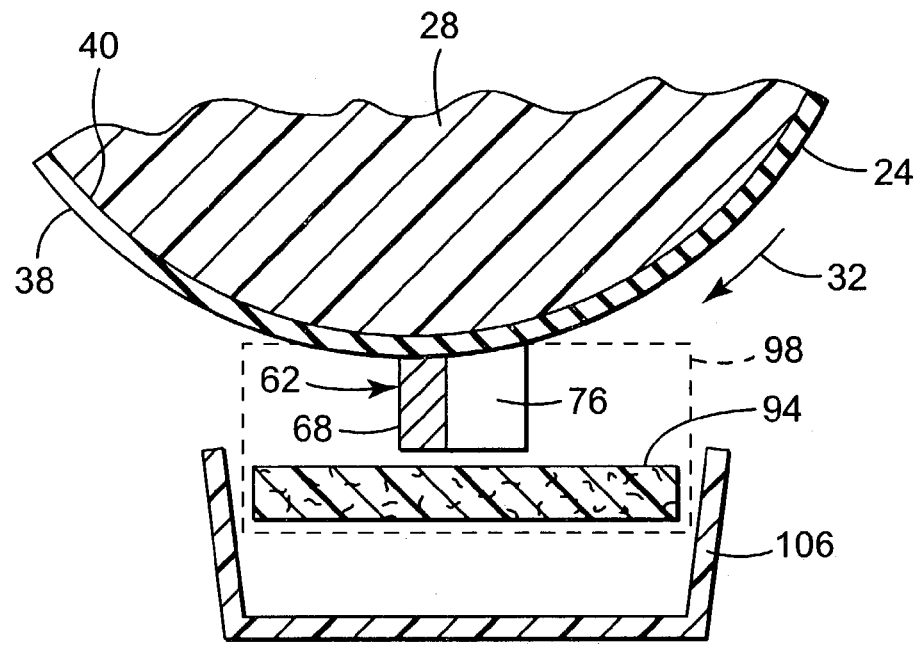
FIG. 5 is a sectional view, as taken along lines 5—5 in FIG. 2.

FIG. 1 illustrates an article conveying system 20 including the cleaning assembly components of the present invention. The conveying system 20 has first and second endless belts 22 and 24. Each belt is supported by a plurality of rollers such as rollers 26 for belt 22 and rollers 28 for belt 24. The rollers define a separate belt travel path for each belt, and at least one of the rollers 26 and 28 for each belt is driven to move that belt along its respective belt travel path. Arrows 30 indicate the direction of movement of belt 22, while arrows 32 indicate the direction of movement of belt 24. Typically, the belts are driven to move at the same rate, although not necessarily.

Each belt has a top face for engaging an article being conveyed by the belt, and an opposite bottom face for engaging its respective rollers. Accordingly, first belt 22 has a top face 34 and a bottom face 36, and second belt 24 has a top face 38 and a bottom face 40.

The first and second endless belts 22 and 24 together define an article transport path 45 between opposed top faces 34 and 38 of the belts 22 and 24, respectively. The article transport path 45 generally consists of the space between the proposed top faces of the belts (see space "d" in FIG. 1A), and extends longitudinally for so long as the top faces are opposed, and extends laterally to adjacent the lateral side edges of the belts. An article to be conveyed, such as article 46a, is introduced at a first end of the article transport path 45, is carried between the opposed top faces of the belts (as indicated by articles 45b, 45c and 45d illustrated in phantom in FIG. 1) and exits the article transport path 45 adjacent a second end thereof (as illustrated by processed article 46e). The article transport path 45 may be linear, as illustrated in FIG. 1, or may include one or more curves, as necessitated by the particular processing being conducted. In addition, the spacing "d" across the article transport path between opposed top faces of the belts may vary. For instance, the article transport path may be wider in spacing adjacent its first end than adjacent its second end. In the illustrated embodiment, the article transport path 45 is a generally upright transport path, with its first end higher than its second end.

In some applications (e.g., cooking), it may be desired to present a heated conveying surface to the article 46. In that situation, heating elements, such as heaters 48 and 50 may be provided to heat the first and second belts 22 and 24 along the article transport path 45.

The endless belts 22 and 24 may be formed from a material that has the sufficient flexibility to traverse its belt travel path and has other desired characteristics, such as a particular frictional characteristic relative to the article being transported and its respective support rollers, and if heating is to be applied to the article, desired thermal characteristics. In one of embodiment, the belt may be constructed from a nickel iron alloy known as Invar™ available from Imphy S.A. Corp., Paris, France. The faces of the belt may also be coated with desired materials, either to control frictional, thermal or other characteristics. Examples of coatings for the top face of the belt are the Excalibur™ coating available from Whitford Corporation, West Chester, Pa. and the Teflon™ coating available from E. I. du Pont de Nemours and Company, Wilmington, Del. While FIG. 1 illustrates heating the article as it traverses the article transport path 45, other manipulation or treatment of the article is also possible, including, for example, the application of pressure and/or the introduction of other components onto the article (e.g., coatings, flavorings, etc.).

During use, debris and liquid may be deposited on the top faces 34 and 38 of the belts 22 and 24. Such debris typically comes from the article being processed, either in the form of article breakage or the extraction of liquids or gases therefrom during processing. The presence of debris and excess liquids on the belts 22 and 24 can degrade performance of the conveying system 20 by, for example, adversely affecting the frictional and/or thermal properties of the belt with respect to the article being transported. In addition, such debris and liquids may also interfere with the engagement of a belt and its respective support rollers, and with other associated processing equipment. Conveying systems such as those illustrated in FIG. 1 are typically employed in highly automated and high product throughput processing systems. Accordingly, extensive downtime of the system for the purpose of cleaning the belts is unacceptable. Such downtime not only inhibits the production of processed articles, but also may be rather labor intensive. Additional handling of the system components also may increase the possibility of damage to the belt, its associated rollers and other equipment components during cleaning and/or removal of a belt for cleaning.

The present invention provides a belt cleaning system which effectively cleans the belt during conveying operations, thereby avoiding the necessity for a system shutdown of undesirable duration for belt cleaning. The inventive system may include a belt wiping blade, absorbent belt wiping pad and belt edge containment seals. These components capture debris and liquids on the top face of each belt, remove it from the belt and/or direct it away from the edges and bottom face of the belt (where it could come into engagement with the support rollers and other equipment (e.g., heaters)).

Belt Wiping Blade Assembly

A belt wiping blade assembly 60 is illustrated in cooperation with the second belt 24 in FIG. 1. The belt wiping blade assembly 60 includes a blade 62 engaging and extending across the top face 38 of the second belt 24. Opposite the blade 62, the belt 24 is supported relative to the blade 62 by one of the rollers 28. The blade 62 is held in place by suitable structure (not shown) which may include means for selectively moving the blade 62 toward and away from the belt 24. The blade 62 is disposed adjacent a lowest extent of the travel path of the belt 24, and in one embodiment, is disposed slightly upstream from that lowest extent, which causes the waste and debris engaged by the blade 62 to be removed from the belt 24 before its natural drop point.

The shape of the blade 62 in one embodiment is illustrated more fully in FIGS. 2–6. FIG. 2 illustrates the blade in plan view, as viewed from the top face 38 of the belt 24 engaging the blade 62. In FIG. 2, lateral side edges 64 and 66 of the belt 24 are illustrated in phantom. The blade 62 has an elongated central section 68 and lateral end edges 70 and 72. Each end edge has a diversion ramp 74, 76, respectively, projecting upstream relative to belt movement pass the blade 62. Each diversion ramp 74 and 76 extends outwardly from the central section 68 of the blade 62 at an obtuse angle. An upper edge of the blade may be configured to accommodate the belt face it engages. For instance, each of the diversion ramps 74 and 76 may have an arced surface adjacent an upper edge 78 of the blade, and/or a portion of the upper edge 78 of the elongated section 68 of the blade 62 may include a radius (see e.g., radius portion 80 along the upper edge 78 of the blade 62). Accordingly, the blade 62 extends across the entire lateral width of the belt 24, and any debris and excess liquid disposed on the top face 38 of the belt 24 is diverted off of the belt 24 by the blade 62. The diversion ramps 74 and 76 serve to direct debris and liquids away from the lateral side edges 64 and 66 of the belt 24.

In one embodiment, the blade is formed from a fluoroelastomer rubber such as Viton™ material available from E. I. du Pont de Nemours and Company, Wilmington, Del. The blade is softer than the belt surface which it engages so that the blade does not scratch the belt as the belt traverses its travel path past the stationary blade. The surfaces of the blade contacting the belt are smooth, the blade is generally stiff and resilient, and the blade does not absorb or exhibit an affinity for any particular form of liquid. In addition, it is important that the blade have a melt temperature higher than the possible temperature of the belt. In one embodiment, the blade has a melt temperature higher than 350° F., preferably higher than 400° F., and more preferably higher than 450° F.

In one embodiment, a belt wiping blade assembly is provided for each of the belts 22 and 24. The belt wiping blade assembly 60 described above is disclosed with respect to the second belt 24, while another belt wiping blade assembly 90 provided for the first belt 22, as seen in FIG. 1. The belt wiping blade assembly 90 has a blade 92, which in all regards is the same as the blade 62. The belt wiping blade assemblies are identically oriented with respect to their respective belts, although the orientations are mirror images of one another, as seen in FIG. 1.

In each belt wiping blade assembly, a filter or screen is disposed below the blade. Debris and liquid removed from the belt by the blade is directed onto the filter. Liquid flows through the filter, while debris is collected on and in the filter for disposal. The belt wiping blade assembly 60 has a filter 94 disposed below the blade 62, while the belt wiping blade assembly 90 has a filter 96 disposed between the blade 92 (see FIGS. 1 and 5). The filters 94 and 96 may be formed from a layer of scrim material or nonwoven material, for example, with voids allowing liquid to flow through and a mat or sheet of fibers which stop the flow of debris and other particulate matter therethrough. For example, a woven fiberglass or polyester scrim or nonwoven polymeric fibers may suffice as the filter. The filters 94 and 96 are supported by suitable structure (not shown in FIGS. 1 and 5) under their respective blades 62 and 92.

Figure 6:
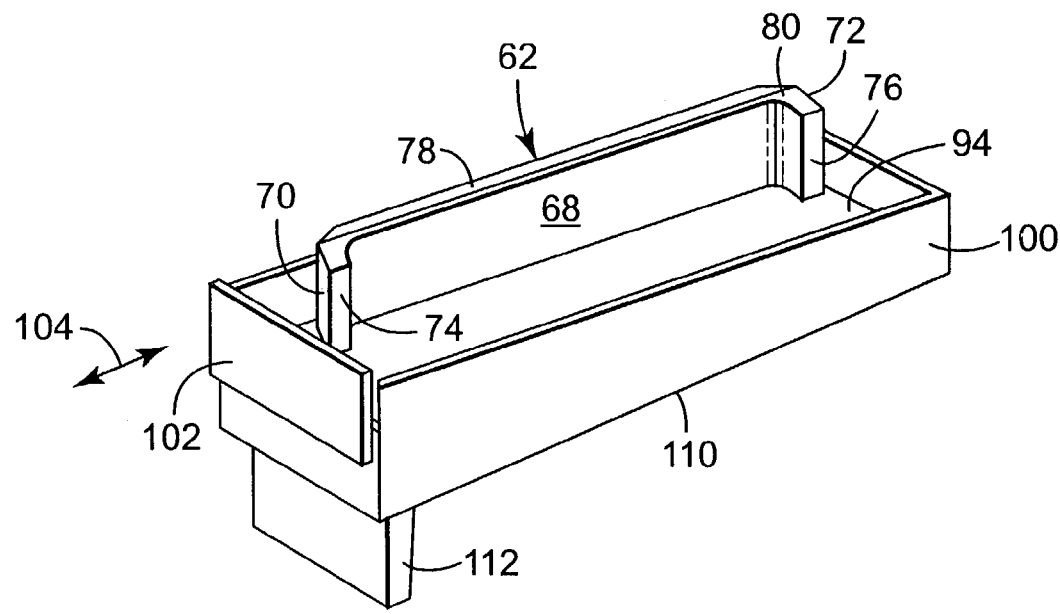
FIG. 6 is a perspective view of the blade of FIG. 2, and its associated filter and liquid collector.

As the blade becomes soiled or damaged in use, it may be removed for cleaning or replacement independently of its respective filter. Alternatively, the blade and filter may be connected in cartridge form (as indicated schematically by phantom cartridge 98 in FIG. 5) for joint removal (for cleaning or replacement) relative to their respective belt. FIG. 6 illustrates an embodiment wherein the filter 94 is laterally slideably received in a housing 100, and has an endplate 102 connected thereto for facilitating slideable removal of the filter 94 relative to the housing 100, as indicated by arrows 104. The filter 94 is thus replaceable without removal of the blade 62 thereabove.

A liquid collector is disposed under the filter of each belt wiping blade assembly to collect liquid removed from the top face of the belt by the blade and run through its filter. The liquid collector can be a trough, or a diverter tray with a drain and conduits leading to a liquid collection reservoir at some remote location (not shown). FIG. 1 illustrates the liquid collectors as troughs 106 and 108 of the belt wiping blade assembly 60 and 90, respectively. In FIG. 6, the trough 106 for the belt wiping blade assembly 60 is shown with a sloped bottom 110, tilting downwardly from one lateral side edge of the belt 24 to the other side edge, with a drain conduit 112 at the lowest end of the sloped bottom 110. The liquid collectors 106 and 108 are supported relative to the respective belts, blades and filters by suitable structure (not shown). If the liquid collector is not provided with a drain, it must be accessible and removable for cleaning and disposal of any liquid therein.

Absorbent Pad Assembly

In spite of the fact that each belt has a blade wiping against it for liquid and debris removal, not all liquid may be removed from a belt by its respective blade. Accordingly, an absorbent material can be brought into engagement with the top face of each belt downstream from the blade for further removal of liquids from the belt. The absorbent material urged into contact with the top face of the belt to wick off and further to wipe off liquids borne by the belt.

Figure 7:
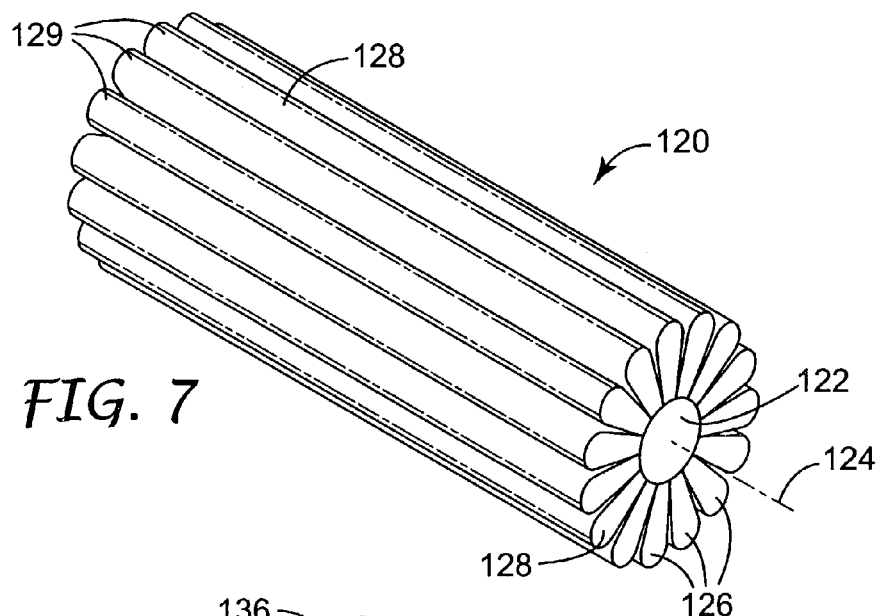
FIG. 7 is a perspective view of an exemplary absorbent material pad which is disposed for contact with the belt face downstream from the wiper blade.

FIG. 7 illustrates an exemplary design for an absorbent pad 120. A core 122 extending along a central axis 124 has a plurality of lobes 126 of absorbent material 128 affixed thereto so that the lobes 126 radiate outwardly therefrom. Outer edges 129 of the lobes 126 cooperatively define the absorbent pad 120 as a generally cylindrical pad assembly. In use, as seen in FIG. 9A, an arced segment of the cylindrical pad assembly is brought into contact with the top face of one of the belts, to define a contact face of the absorbent pad. Although disclosed as a generally cylindrically shaped absorbent pad 120, the absorbent material 128 can take other forms. For example, the absorbent material can be a static pad (see, e.g., FIG. 10) or could be disposed as a belt (endless or running end to end) which can have an arced portion thereof brought into contact with the top face of the belt to be cleaned.

The absorbent material is flexible, and may be formed from a nonwoven material, a woven material, a knit material, or combinations thereof. Suitable materials include polyethylene, polypropylene, polyolefins, polyesters and nylons. In one embodiment, the absorbent material has certain desired absorbency characteristics, such as being oleophilic, hydrophilic, or combinations thereof. The absorbent material must also be softer than the belt face against which it is engaged, so that the belt face is not scratched or otherwise abraded during the cleaning process. Further, the absorbent material should be nonshedding of fibers so that it does not itself contaminate the belt with debris (and likewise does not contaminate the articles conveyed by the belt, a significant concern when the articles are food items). In one embodiment, a scrim is disposed between the absorbent material and top face of its respective belt. In addition, it is important that the absorbent material have a melt temperature higher than the possible temperature of the belt. In one embodiment, the absorbent material has a melt temperature higher than 350° F., preferably higher than 400° F., and more preferably higher than 450° F.

The absorbent pad 120 is shown in FIG. 1 in contact with the first belt 122 for cleaning. A similar absorbent pad 130 is shown in FIG. 1, in contact with the second belt 24. The absorbent pads 120 and 130 are generally identical, although oriented for mirror image operation with respect to their respective belts 22 and 24.

In one embodiment, the absorbent pad 120 is rotated about its axis 124 to engage different portions thereof (as its contact face) with its respective belt (see, e.g., arrows 132 in FIG. 1). Thus, a clean portion of the outer cylindrical surface of the absorbent pad 120 can be indexed into position to engage the belt for belt cleaning. The cylindrically shaped absorbent pad 128 is not rotated to move its outer surface as the same rate as its belt, but may be indexed periodically (either manually or by a motor or other mechanized means). Once the cylindrically shaped absorbent pad 128 has been completely indexed through an entire rotation about its axis 124, or is otherwise deemed to be fully saturated with liquid, it is replaced with a fresh absorbent pad.

Figure 8:
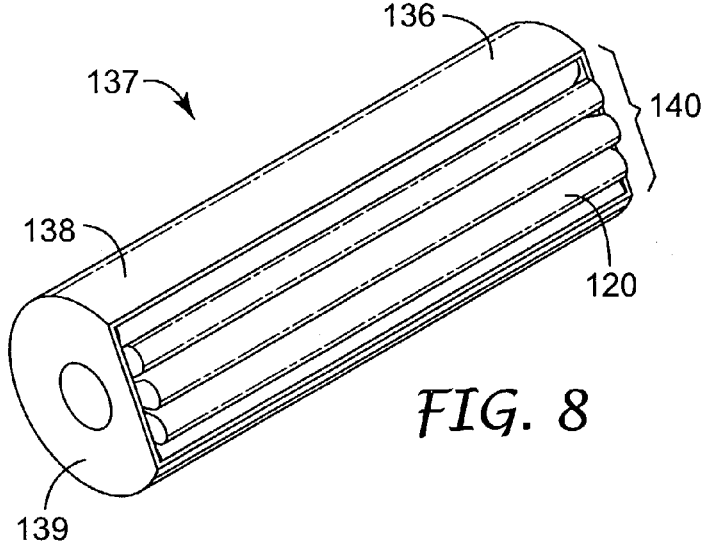
FIG. 8 is a perspective view of the absorbent material pad disposed in a pad holding housing, having a pad exposing window therein.
Figure 9:
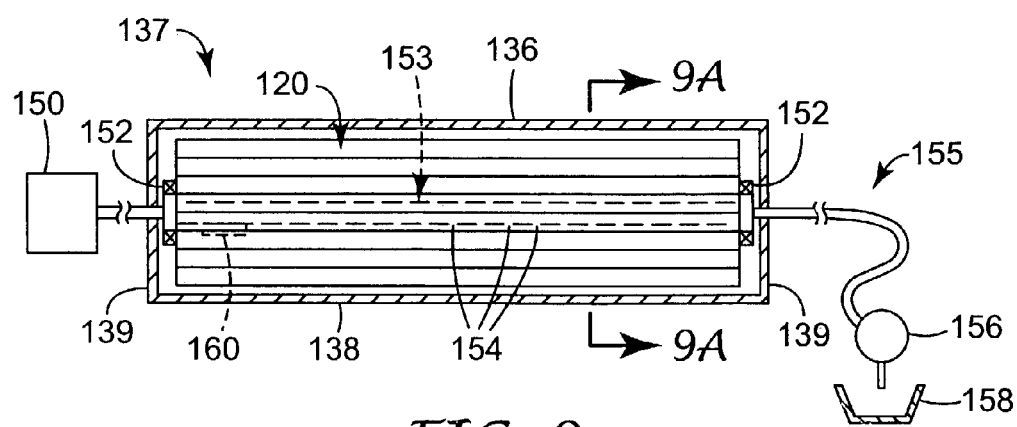
FIG. 9 is a sectional view through the housing of FIG. 7, schematically showing an alternative motor and/or liquid collection system connected thereto.
Figure 9A:
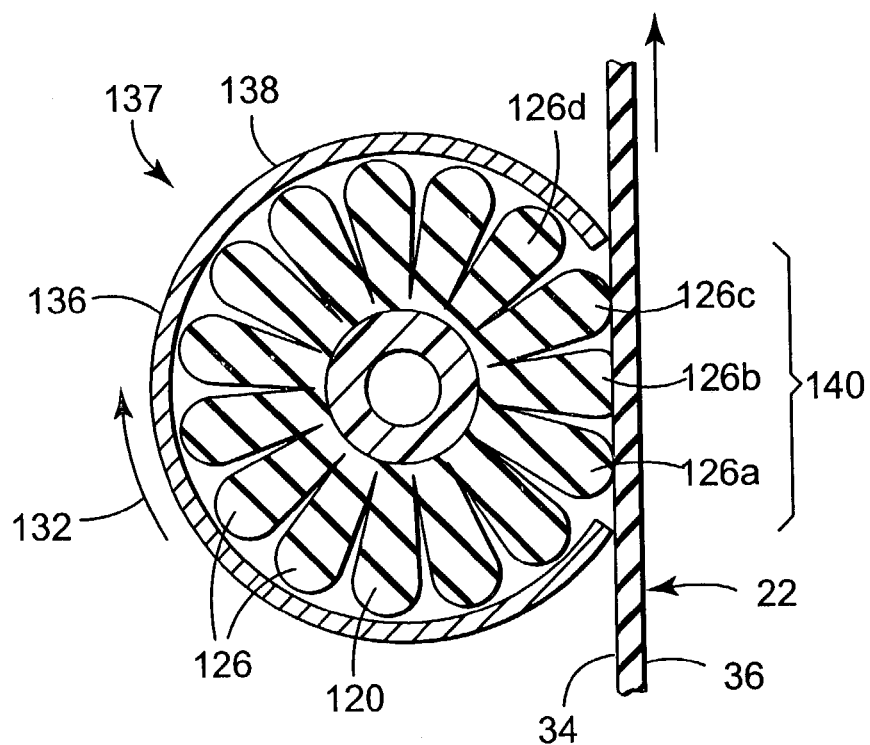
FIG. 9A is an enlarged longitudinal section through an absorbent material pad cartridge and its associated belt, aligned for engagement and operation.

FIGS. 8, 9 and 9A illustrate the absorbent pad 120 borne by a pad housing 136, thereby defining a pad cartridge 137. The housing 136 has an enclosure defined by a cylindrical sidewall 138 and opposed endcaps 139, with a laterally disposed window 140 in the sidewall 138 for exposure of a portion of the absorbent pad 120. As best seen in FIG. 9A, the window 140 is aligned to expose one or more lobes 126 of the absorbent material 128 of the absorbent pad 120. In one embodiment, exposed lobes 126a, 126b and 126c are in engagement with the top face 34 of the belt 22 as it moves past the absorbent material 120. Indexing the cylindrically shaped absorbent material 128 about its axis 124 (in direction of arrows 132) will bring the next lobe 126d into contact with the belt 22, while allowing lobe 126a (now fully saturated with liquid) to be moved out of engagement with the belt. Those lobes in contact with the top face of the belt deform to increase the surface area of absorbent material in contact with the belt face and "wipe" the belt face with absorbent material.

The absorbent pad 120 (or if in cartridge form, the cartridge 138), is supported by suitable structure (not shown) relative to its respective belt. The absorbent pad 120 is removeable and replaceable, so that once fully saturated with liquid, a fresh pad can be substituted for the soiled one. The pad may be removeable from adjacent the belt, from its housing if one is provided, or it may be replaced in cartridge form (i.e., the pad and housing are removed and replaced together).

As illustrated in FIG. 9, a motor 150 may be rotatably coupled by suitable means to the core 122 of the absorbent pad 120, for rotation thereof relative to the housing 136. Suitable bearings 152 may be provided to facilitate such rotation. The motor can thus be activated periodically to rotate the absorbent pad 120 and sequentially present fresh absorbent material to the belt. In another embodiment, the core is formed as a hollow tube 153 which is perforated (as at 154). The hollow tube 153 is sealed at one end, while at its other end it is coupled to a liquid evacuation system 155 having a pump 156 and liquid collector 158. Thus, absorption of liquid from the belt is aided by drawing a vacuum through the absorbent material to draw liquid from its outer edges to the core (a hollow tube) and then out of the core to be collected. Alternatively, removal of the liquid from the core is accomplished via mechanical means such as a screw auger, piston drive or other fluid conveyance mechanism, alone or in combination with a vacuum draw. In addition, the axis of the core can be tilted relative to horizontal to aid in liquid drainage toward its lower end, and removal therefrom.

In one embodiment, means are provided for sensing when the absorbent pad is fully saturated with liquid, and thus needs removal for cleaning or replacement. Such sensing means may simply be a timer based upon usage, indicating a presumed degree of liquid saturation over time of operation, a sensor based on linear exposure of the belt to the absorbent material, or a weight based sensor, detecting the change in weight of the absorbent pad as it becomes saturated with liquid. In another embodiment, the sensor may be an optical sensor 160 mounted, for example, on the core. The optical sensor 160 may be aligned to be directed radially outwardly from the core, to detect the change in opacity of the absorbent material as it becomes saturated with liquid (the absorbent material becomes less opaque as it becomes more saturated). The sensor may also be used to detect partial saturation, and thus provide a signal (e.g., to the motor 15) to facilitate indexed advance of the absorbent material relative to the belt.

Figure 10:
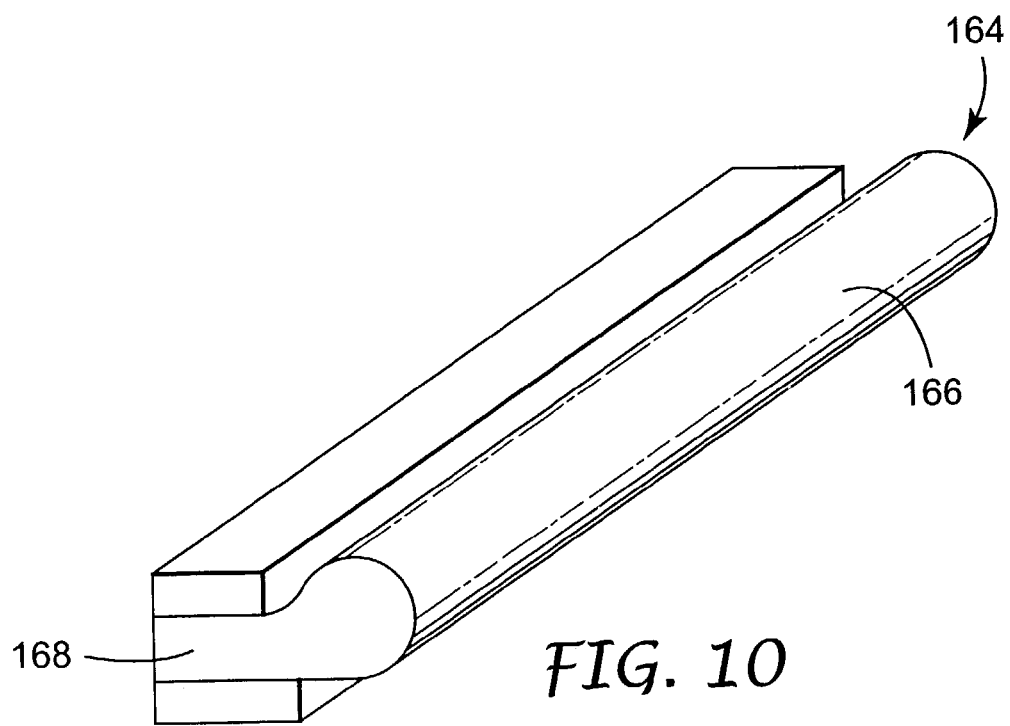
FIG. 10 is a perspective view of an alternative embodiment of the belt cleaning absorbent material pad of the present invention.

FIG. 10 illustrates an alternative absorbent pad design 164. The alternate pad design 164 is aligned to present a single lateral pad surface 166 of absorbent material 168 to a passing belt. The absorbent pad 164 is not indexable relative to the belt, and once the absorbent material 168 is fully saturated with liquid, the absorbent pad 164 is simply replaced, or removed for cleaning and reuse. The pad surface 166 is positioned by suitable structure (not shown) relative to the face of its respective belt to be engaged so that it deflects against it to present the largest, possible surface area, and thereby "wipe" the face of the belt while absorbing liquids therefrom.

As illustrated by the phantom absorbent pads 162 in FIG. 1, absorbent material may be disposed to wipe against the bottom faces 36 and 40 of the belts 22 and 24, thereby removing by absorption any residual liquid thereon (that may have migrated to the bottom face during processing from the top face of the belt).

Figure 10A:
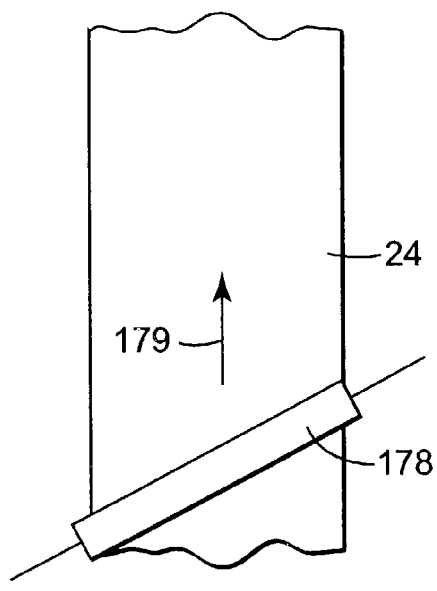
FIG. 10A is a schematic illustration of an absorbent material pad aligned at a tilted angle relative to the belt engaged by the absorbent material pad.
Figure 11:
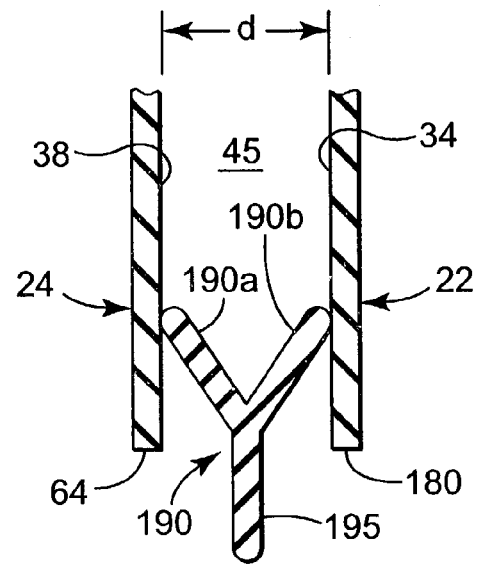
FIG. 11 is an enlarged view of the portion of FIG. 1A indicated by the dashed outline 11, showing one of the belt seals.
Figure 12:
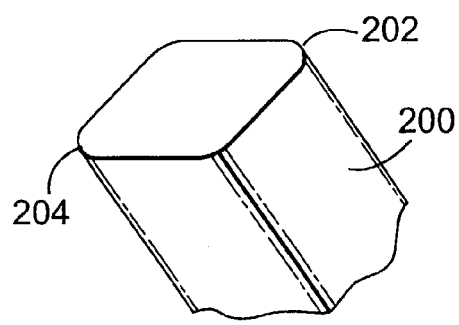
FIG. 12 is a perspective view of a portion of an alternative design for the belt seal.

In order to increase the amount of absorbent material exposed to the belt face, the absorbent material may be tilted relative to the belt travel direction (see, e.g., FIG. 10A). Accordingly, the absorbent material (whether in the form 128 shown in FIGS. 1 and 7–9A or in the form 168 shown in FIG. 10, or in some other functionally equivalent form) is disposed as at 178 in FIG. 10A, relative to a belt such as belt 24. The direction of belt travel is indicated by arrow 179. As seen, absorbent material 178 is tilted relative to the belt 24 (i.e., tilted relative to horizontal). Thus, the absorbent material can be longer than the lateral width of the belt, and thereby present a greater surface area to the belt face which passes by the absorbent material.

Belt Edge Seals

As noted above, it is undesirable that liquid and/or debris migrate from the top face of a belt to its edges or to its bottom face. The inventive cleaning assembly thus includes edge seals for placement between the opposed belts along the article transport path. The edge seals serve as a physical barrier to contain liquids and debris from reaching the lateral side edges of the belts. As seen in FIG. 1A, the first belt 22 has lateral side edges 180 and 182, while the second belt 24, as shown in FIG. 2, has lateral side edges 64 and 66. Along the article transport path 45, the opposed top faces 34 and 38 of the belts 22 and 24 are spaced apart by a distance "d". A first resilient edge seal 190 is disposed across the space "d" adjacent the lateral side edges 180 and 64, while a second resilient edge seal 192 is disposed adjacent opposed lateral side edges 182 and 66.

In one embodiment, each edge seal is y-shaped, and has longitudinally extending legs or fins resiliently urged outwardly against the top faces of the opposed belts. Edge seal 190 has legs 190a and 190b, while edge seal 192 has legs 192a and 192b. The distal end of each leg or fin is rounded for smooth engagement with the top face of its respective belt. A center dorsal fin 195 (or series of tabs) is provided on edge seal 190 for ease of manipulation, mounting and handling thereof. Edge seal 192 likewise has a center dorsal fin 197. The edge seals thus prevent liquid from moving to the lateral side edges of the belts, and further from moving to the bottom side of each belt. In addition, gasses (such as steam) that may be generated during processing of the article along the article transport path between the belts can be contained by the edge seals and diverted to an appropriate exhaust path.

Figure 13:
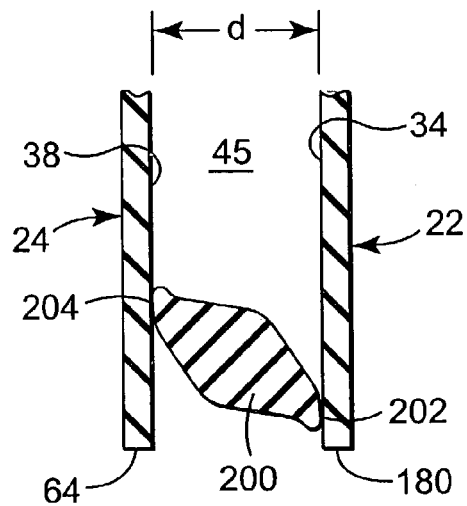
FIG. 13 is a partial sectional view showing the belt seal of FIG. 12 disposed between the opposed faces of the belts.
Figure 14:
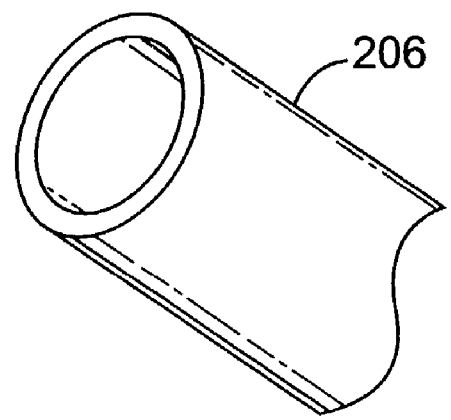
FIG. 14 is a perspective view of a portion of an alternative designed for the belt seal.
Figure 15:
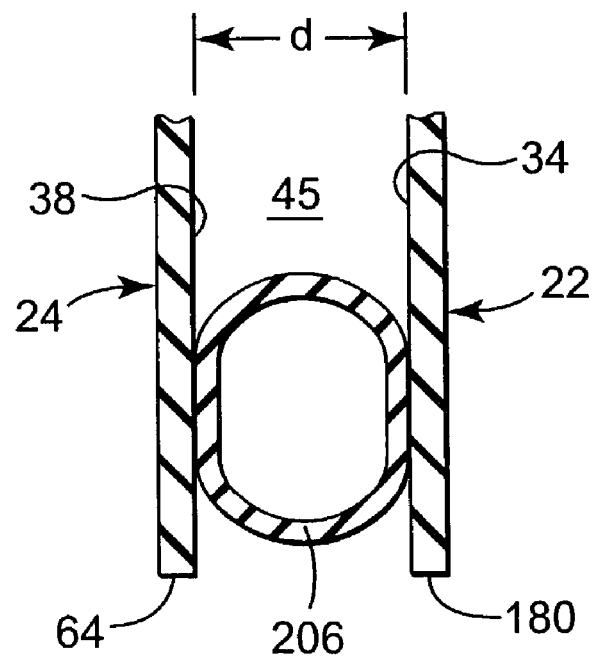
FIG. 15 is a partial sectional view showing the belt seal of FIG. 14 disposed between the opposed faces of the belts.

In an alternative embodiment, the edge seal is an elongate compressible solid member 200, having opposed belt engagement edges 202 and 204. The solid member 200 is resilient and is inserted (by twisting and/or compression thereof) between the opposed belts 22 and 24, as seen in FIG. 13, with its edges 202 and 204 pressed against the top faces 34 and 38 of the belts. In another alternative embodiment of the edge seal, the edge seal is a hollow elongated tubular member 206. The tubular member 206 is resilient and is inserted between the opposed belts 22 and 24. It deforms to fit the gap "d" therebetween and form a seal as it is pressed against the top faces 34 and 38 of each belt. It is contemplated that solid member 200 and tubular member 206 will be mounted at their ends relative to the article conveying system.

In one embodiment, the edge seals are formed from, for example, a polyester or nylon material which is softer than the belts, so that scratching of the belts does not occur during use. In all embodiments of the edge seal, the material forming the seal is resilient enough to accommodate changes in dimension "d" along the article transport path. The edge seals are flexible, resilient and non-absorbing of liquids. In addition, it is important that the edge seals have a melting temperature higher than the possible temperature of the belt. In one embodiment, the belt seals have a melt temperature higher than 350° F., preferably higher than 400° F., and more preferably higher than 450° F. The edge seals are easily replaceable when worn or for access to the article transport path between the opposed belts.

Although the present invention has been described with reference to preferred embodiments, workers skilled in the art will recognize that changes may be made in form and detail without departing from the spirit and scope of the invention.

What is claimed is:

1. A cleaning assembly for removing liquids from an endless conveyor belt, the assembly comprising:
   a liquid absorbent material disposed adjacent the belt, with the absorbent material having a contact face thereon which is moveable relative to the belt so that different portions of the contact face are sequentially engageable with the belt for wiping liquids from the belt;
   a central lateral core, wherein the central lateral core includes means for attracting liquid in the absorbent material into the central lateral core;
   a housing for the absorbent material; and
   wherein the absorbent material and the housing comprise an absorbent material cartridge which is separable from the belt for cleaning or replacement of the absorbent material cartridge.

2. The cleaning assembly of claim 1, and further comprising:
   a sensor for generating a signal indicative of a degree of liquid saturation of the absorbent material.

3. The cleaning assembly of claim 2 wherein the sensor detects a change in weight of the absorbent material over time.

4. The cleaning assembly of claim 2 wherein the sensor detects a change in opacity of the absorbent material over time.

5. A cleaning assembly for removing liquids from an endless conveyor belt, the assembly comprising:
   a liquid absorbent material disposed adjacent the belt, with the absorbent material having a contact face thereon which is moveable relative to the belt so that different portions of the contact face are sequentially engageable with the belt for wiping liquids from the belt; and
   a housing for the absorbent material;
   wherein the absorbent material and the housing comprise an absorbent material cartridge which is separable from the belt for cleaning or replacement of the absorbent material cartridge.

6. The cleaning assembly of claim 5 wherein that portion of the contact face of the absorbent material in engagement with the belt is disposed in an arc.

7. The cleaning assembly of claim 6 wherein the contact face is defined by outer edges of a plurality of laterally extending lobes of absorbent material which radiate outwardly from a central lateral core.

8. The cleaning assembly of claim 7 wherein the core includes means for attracting liquid in the absorbent material toward the core.

9. The cleaning assembly of claim 8 and further comprising:
   means for withdrawing liquid from the core.

10. The cleaning assembly of claim 6, and further comprising:
    means for sequentially moving the contact face of the absorbent material relative to the belt.

11. The cleaning assembly of claim 5 wherein a scrim is disposed between the absorbent material and the belt.

12. The cleaning assembly of claim 5 wherein the absorbent material is selected from the group consisting of a nonwoven material, a woven material, and a knit material, or combinations thereof.

13. The cleaning assembly of claim 5 wherein the absorbent material has a melt temperature greater than 350° F.

14. The cleaning assembly of claim 5 wherein the absorbent material is separable from the housing for cleaning or replacement of the absorbent material.

15. The cleaning assembly of claim 5, and further comprising:
    a sensor for generating a signal indicative of a degree of liquid saturation of the absorbent material.

16. The cleaning assembly of claim 15 wherein the sensor detects a change in weight of the absorbent material over time.

17. The cleaning assembly of claim 15 wherein the sensor detects a change in opacity of the absorbent material over time.

18. The cleaning assembly of claim 5 wherein the absorbent material has one or more of the following characteristics: oleophilic, hydrophilic, or a combination thereof.

19. A cleaning assembly for removing liquids from an endless conveyor belt, the assembly comprising:
    a liquid absorbent material disposed adjacent the belt, with the absorbent material having a contact face thereon which is moveable relative to the belt so that different portions of the contact face are sequentially engageable with the belt for wiping liquids from the belt; and
    a sensor for generating a signal indicative of a degree of liquid saturation of the absorbent material.

20. The cleaning assembly of claim 19 wherein the sensor detects a change in weight of the absorbent material over time.

21. The cleaning assembly of claim 19 wherein the sensor detects a change in opacity of the absorbent material over time.

22. The cleaning assembly of claim 19 wherein that portion of the contact face of the absorbent material in engagement with the belt is disposed in an arc.

23. The cleaning assembly of claim 22 wherein the contact face is defined by outer edges of a plurality of laterally extending lobes of absorbent material which radiate outwardly from a central lateral core.

24. The cleaning assembly of claim 23 wherein the core includes means for attracting liquid in the absorbent material toward the core.

25. The cleaning assembly of claim 24 and further comprising:
means for withdrawing liquid from the core.

26. The cleaning assembly of claim 22, and further comprising:
means for sequentially moving the contact face of the absorbent material relative to the belt.

27. The cleaning assembly of claim 19 wherein a scrim is disposed between the absorbent material and the belt.

28. The cleaning assembly of claim 19 wherein the absorbent material is selected from the group consisting of a nonwoven material, a woven material, and a knit material, or combinations thereof.

29. The cleaning assembly of claim 19 wherein the absorbent material has a melt temperature greater than 350° F.

30. The cleaning assembly of claim 19, and further comprising:
a housing for the absorbent material.

31. The cleaning assembly of claim 30 wherein the absorbent material is separable from the housing for cleaning or replacement of the absorbent material.

32. The cleaning assembly of claim 30 wherein the absorbent material and the housing comprise an absorbent material cartridge which is separable from the belt for cleaning or replacement of the absorbent material cartridge.

33. The cleaning assembly of claim 19 wherein the absorbent material has one or more of the following characteristics: oleophilic, hydrophilic, or a combination thereof.

* * * * *

UNITED STATES PATENT AND TRADEMARK OFFICE
CERTIFICATE OF CORRECTION

PATENT NO.      : 7,055,675 B2                                        Page 1 of 1
APPLICATION NO. : 10/309790
DATED           : June 6, 2006
INVENTOR(S)     : Lance E. Behymer It is certified that error appears in the above-identified patent and that said Letters Patent is hereby corrected as shown below:

Title Page
Under item (56), line 2, (Foreign Patent Documents) below "3/1982" insert entries:
WO    WO96/36757    11/1996
WO    WO00/17436    03/2000
WO    WO01/26499    04/2001
WO    WO01/26527    04/2001
WO    WO01/26528    04/2001
WO    WO01/26530    04/2001
WO    WO01/27239    04/2001
WO    WO02/36339    05/2002

Signed and Sealed this

Fourteenth Day of November, 2006

JON W. DUDAS
*Director of the United States Patent and Trademark Office*